No. 716,372. Patented Dec. 23, 1902.
O. T. BLÁTHY.
INDUCTION ALTERNATE CURRENT METER.
(Application filed Mar. 20, 1902.)
(No Model.)
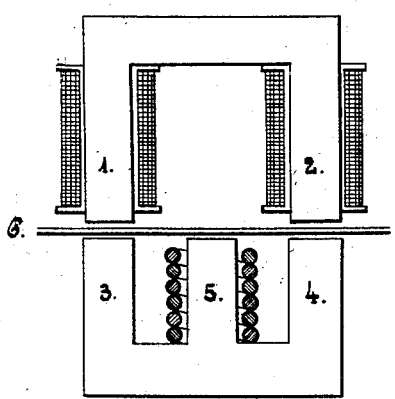
Fig.1.
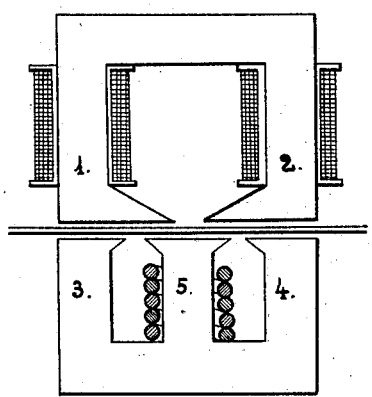
Fig.2.
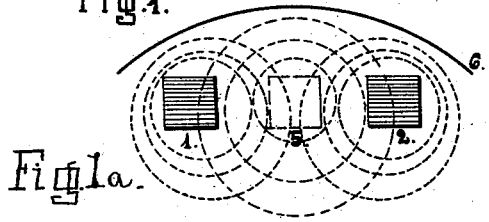
Fig.1a.
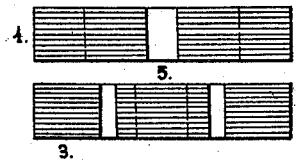
Fig.2a.
Fig.2b.
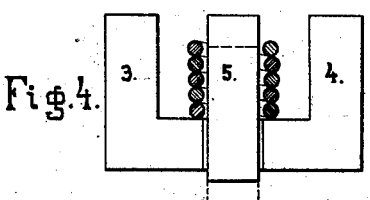
Fig.4.
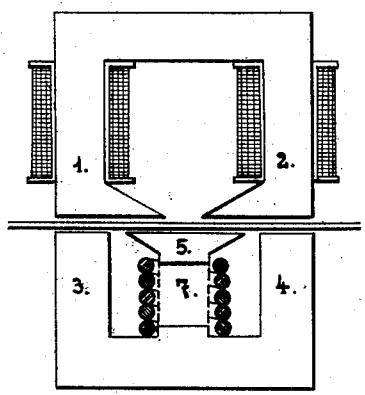
Fig.3.
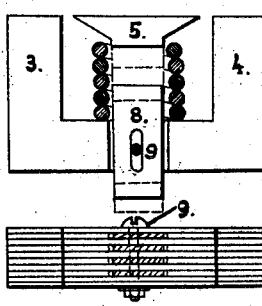
Fig.5.
Fig.5a.
WITNESSES:
F. W. Wright
Walter A. Eber
Otto Titus Bláthy
INVENTOR
BY
Howson and Howson
ATTORNEYS

UNITED STATES PATENT OFFICE.

OTTO TITUS BLÁTHY, OF BUDAPEST, AUSTRIA-HUNGARY.

INDUCTION ALTERNATE-CURRENT METER.

SPECIFICATION forming part of Letters Patent No. 716,372, dated December 23, 1902.

Application filed March 20, 1902. Serial No. 99,156. (No model.)

*To all whom it may concern:*

Be it known that I, OTTO TITUS BLÁTHY, a subject of the Emperor of Austria-Hungary, residing at Budapest, Austria-Hungary, have invented new and useful Improvements in or Relating to Induction Alternate-Current Meters; of which the following is a specification.

This invention relates to an alternate-current meter operating on the Ferraris principle and giving indications in good proportions through the whole range of the readings combined with very small power consumption on the coils. In order to obtain these valuable qualities, care must be taken that the braking action of the driving-fields may be as small as possible as compared with the strength of the permanent braking-magnet, the said braking action of the driving-fields being a variable quantity depending upon the variations in their strength. In other words, the fundamental condition of a good proportionality of the meter is that the driving moment of the active fields should be as great as possible as compared with their braking moment. The peculiar arrangement of the active magnetic fields adopted in apparatus according to the present invention secures a great driving moment combined with a small braking moment of the fields. A good proportionality of the readings on the whole scale requires, further, that for the lower curved part of the magnetizing-curve corresponding to small magnetizing-currents a straight line should be substituted. The current-meters of Raab and Stanley meet this requirement, but at the cost of the power of the meter, for the main current-fields of these meters do not contain iron. I have found that by suitably combining the iron cores of the main-current magnetic field with air-gaps greater than that required for the free movement of the rotating disk a good proportionality of the readings can be secured even with small currents in the main circuit, thus at the same time increasing the driving moment of the fields and reducing the losses of power in the coils.

The accompanying drawings illustrate several forms in which the present invention can be carried out, the same numerals referring to like parts in the several figures.

Figure 1 is a side elevation, and Fig. 1ª is a plan, of the simplest form. Fig. 2 shows a modification, the pole-pieces of the cores being widened, this representing an intermediate form between the constructions of Fig. 1 and Fig. 3. Figs. 2ª and 2ᵇ are views of the pole-faces of the meter, Fig. 2. Fig. 3 shows an improved form of the constructions shown in Fig. 2. Figs. 4 and 5 show improved forms of the constructions shown in Figs. 1 and 3, with means of suitably adjusting the constant of the meter. Fig. 5ª is a view of the end pole-faces with the central pole-face and the coils removed.

As shown in the figures, a meter according to the present invention consists of two iron cores, the one, 1 2, U-shaped and the other, 3 4 5, E-shaped, the one placed above, the other below, the rotating disk in such a manner that the poles 1 2 of the U-shaped core face the outer limbs 3 4 of the E-shaped core. The U-shaped core receives the voltage-coils, while the main-current coils are wound around the middle limb 5 of the E-shaped core.

The construction shown in Fig. 1 affords the following advantages:

First. The voltage field-circuit is well closed magnetically, requiring in consequence only small magnetizing-currents.

Second. The main-current field contains a great air-space, insuring thus proportionality in the magnetizing, even with small currents.

Third. The eddy-currents induced in the rotating disk 6 by the magnetic field (shown in dotted lines in the plan) extend very well into the fields of force acting dynamically upon them, so that an energetic driving moment is insured.

In the construction shown in Fig. 2 (the plan of which shows for the sake of greater clearness the pole-pieces displaced horizontally) the widening of the pole-pieces secures a better interlacing of the lines of force with the eddy-currents induced in the disk, and gives thus a greater driving moment. This construction has, however, the drawback that the main-current magnetic field contains but a small air-space. In order to obviate this inconvenience, I apply an interruption in the form of an air-gap 7 (see Fig. 3) in the main-current magnetic circuit, most suitably in the middle limb 5 of the E-shaped core. This construction gives a greater driving moment than the construction shown in Fig. 1 and a better proportionality than that shown in Fig. 2. The interruption 7 in the magnetic circuit of the main current might be applied also in the construction shown in Fig. 1.

Figs. 4 and 5 show means of adjusting the constant of the meter. The construction shown in Fig. 4 differs from that shown in Fig. 1 in that the limb 5 of the E-shaped core can be moved nearer to or farther from the rotating disk, thus increasing or diminishing the strength of the main magnetic field. In the construction shown in Fig. 5 the displacing of the core-piece 8, which passes through the yoke, allows the air-gap in the interior of the limb 5 to be increased or diminished in order to adjust conveniently the constant of the meter without substantially altering the distribution of the lines of force which traverse the disk. The plan of this figure shows a suitable arrangement of the plates of which the core-piece is built up, the screw 9 serving to fix the movable core-piece 8 to the yoke in any desired position.

The magnetically well-closed forms shown, especially that shown in Fig. 3, with the modification shown in Fig. 5, are suitable for very simple biphase or triphase induction-meters, in which two of such field constructions as are above described can be arranged at suitable distance—for instance, diametrically opposite—around the rotating disk.

I claim as my invention—

1. In an electric meter of the Ferraris type, the combination of a U-shaped iron core having the voltage-coils and an E-shaped iron core having on its middle leg the current-coils, with a rotating disk disposed between said cores, the outer legs of said E-shaped core being opposite to the legs of said U-shaped core, substantially as described.

2. In an electric meter of the Ferraris type, the combination of a U-shaped iron core having the voltage-coils and an E-shaped iron core having on its middle leg the current-coils, with a rotating disk disposed between said cores, the outer legs of said E-shaped core being opposite to the legs of the U-shaped core, and said cores having widened pole-pieces, substantially as and for the purposes described.

3. In an electric meter of the Ferraris type, the combination of a U-shaped iron core having the voltage-coils and an E-shaped iron core having on its middle leg the current-coils, with a rotating disk disposed between said cores, the outer legs of said E-shaped core being opposite to the legs of the U-shaped core, and the legs of this latter and the middle leg of the E-shaped core being provided with widened pole-pieces, substantially as and for the purpose specified.

4. In an electric meter of the Ferraris type, the combination of a U-shaped iron core having the voltage-coils and an E-shaped iron core having on its middle leg the current-coils, with a rotating disk disposed between said cores, the outer legs of said E-shaped core being opposite to the legs of said U-shaped core, and an interruption being provided in the main current magnetic circuit in order to enlarge the air-gap in said magnetic circuit, substantially as and for the purposes specified.

5. In an electric meter of the Ferraris type, the combination of a U-shaped iron core having the voltage-coils and an E-shaped iron core having on its middle leg the current-coils, with the rotating disk disposed between said cores, the outer legs of said E-shaped core being opposite to the legs of said U-shaped core, and an interruption being provided in the middle leg of the E-shaped core, substantially as and for the purpose specified.

6. In an electric meter of the Ferraris type, the combination of a U-shaped iron core having the voltage-coils and an E-shaped iron core having on its middle leg the current-coils, with the rotating disk disposed between said cores, the outer legs of said E-shaped core being opposite to the legs of said U-shaped core and means being provided for enlarging and regulating the air-gap in the main current magnetic circuit, substantially as and for the purpose specified.

7. In an electric meter of the Ferraris type, the combination of a U-shaped iron core having the voltage-coils and an E-shaped iron core having on its middle leg the current-coils, with the rotating disk disposed between said cores, the outer legs of said E-shaped core being opposite to the legs of said U-shaped core, an air-gap being provided in the middle leg of the E-shaped core and means for adjusting the air-gap, substantially as and for the purpose specified.

In testimony whereof I have signed my name to this specification in the presence of two subscribing witnesses.

OTTO TITUS BLÁTHY.

Witnesses:
 FRANK DYER CHESTER,
 RAYMOND WILLEY.